H. DEITZ.
PIPE CONNECTION
APPLICATION FILED JUNE 19, 1916.
1,198,528.
Patented Sept. 19, 1916.
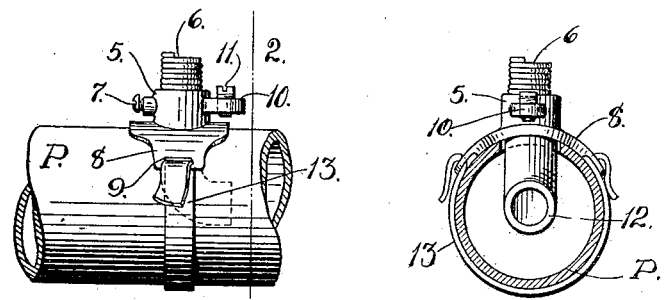
Fig. 1.
Fig. 2.
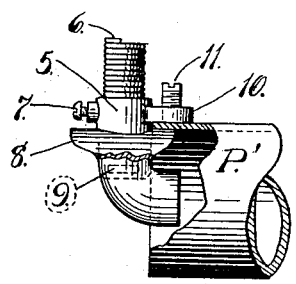
Fig. 3
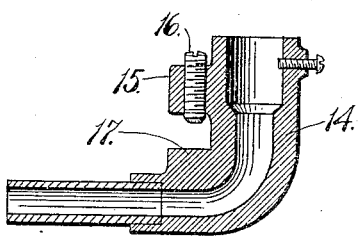
Fig. 4.
Witness
John B. Dade
By
Inventor
Henry Deitz.
W.W. Boughton
Attorney

UNITED STATES PATENT OFFICE.

HENRY DEITZ, OF DENVER, COLORADO.

PIPE CONNECTION.

1,198,528. Specification of Letters Patent. Patented Sept. 19, 1916.

Original application filed February 11, 1916, Serial No. 77,591. Divided and this application filed June 19, 1916. Serial No. 104,393.

*To all whom it may concern:*

Be it known that I, HENRY DEITZ, a citizen of the United States, and a resident of Denver, in the county of Denver and State of Colorado, have invented a certain new and useful Improvement in Pipe Connections, of which the following is a full, clear, and exact description.

This invention is an improvement in devices for connecting a smaller pipe to a larger one, said pipes being so arranged that a current of air in the larger pipe will serve to draw a gas or vapor through the smaller pipe into the larger by an injector action.

My device is especially adapted for use in connecting an auxiliary source of steam or moist air to the intake pipe of a carbureter of an internal combustion engine.

The principal object of my invention is to so design the device that it may readily be connected to and disconnected from the intake pipe of a carbureter and that the maximum injector action will be obtained.

A second object is to provide a device of the character described which without change will be capable of attachment either to an open intake or to one where the air supplied to the carbureter comes from heating means, as the case may be.

Further and more particular objects and advantages of my invention will later appear from this specification.

In the single sheet of drawings accompanying this application and forming a part hereof Figure 1 is a side view of one form of my invention as applied to a closed-end intake pipe; Fig. 2 is a cross section through Fig. 1 taken on the line 2—2 of that figure; Fig. 3 is a broken away side view of the same modification of my invention as shown in Figs. 1 and 2 illustrating it as applied to an open-end intake pipe; and Fig. 4 is a central section on a somewhat larger scale through a modified form of my invention.

The subject matter of Figs. 1, 2 and 3 of this application was disclosed in a previous application for patent filed by me on February 11, 1916, Serial Number 77,591 from which application said matter had been divided, and this application is a continuation of that application in respect to all common subject matter.

The preferred form of my invention shown in Figs. 1, 2, and 3 is what I term a universal connection in that the same connection is adapted for use either with an open-end pipe or with one where an opening must be drilled in the intake. This connection comprises a tubular body member 5 bent at right angles at its lower end to extend as shown substantially on the axis of the pipe to which it is to connect. In its upper end the member 5 has a socket for the reception of a section of flexible tubing 6 which connects to the source of steam or moist air and which is retained in its socket by the set screw 7. About midway down its vertical portion the member 5 has a cylindrically curved cape 8, the curvature given the cape 8 being such as to coincide with the curvature of the pipe to which the connection is to be made, the cape being provided adjacent its lower straight edges with slots or other attaching means 9. Above the cape the member 5 also carries a radially projecting lug 10 which is tapped for the reception of a set screw 11. If desired this connection may be inserted through an opening made in the intake pipe and this manner of mounting it is illustrated in Figs. 1 and 2. So placed the lower end 12 of the member 5 extends substantially into the center of the intake pipe, thus increasing the efficiency of the injector action, and the cape 8 fits down on the exterior of the pipe P and seals any space which may be left unfilled by the member 5. The device is then secured in position by a soft metal strip or the like 13 which is passed through the slots 9 and bent down to hold the parts securely in place. In this use the lug 10 and the set screw 11 are idle. If, however, it is desired to attach the device to a car having an open-end intake pipe P′ the same connection may be employed without change, as illustrated in Fig. 3. Here the cape 8 is set against the interior of the pipe P′ and the pipe is grasped between the cape and the lug 10, the set screw 11 firmly holding the parts in position. In this mounting the strap 13 is not required.

In Fig. 4 I have illustrated a modification of my device applicable only to cars with the open-end intake. In general outline the body member 14 of this form is similar to the body 5 of the previous modification and it has a lug 15 and set screw 16 corresponding to the lug 10 and screw 11. But in this form the cape 8 is replaced by a curved surface 17 on the front side of the body member 14 only. This form of my device is applied to the intake in the same manner as shown in Fig. 3, the pipe P' being grasped between the face 17 and the set screw 16.

Having thus described my invention, what I claim and desire to secure by Letters Patent is:—

1. In a device of the class described, a tubular member, an outer surface thereon curved in conformity with the curvature of the pipe to which the device is to be secured, a lug extending radially from said tubular member above said surface, and a set screw in said lug.

2. In a device of the class described, a tubular member having its lower end bent at right angles to the body portion thereof, an outer surface on the upper portion of said tubular member curved in conformity with the curvature of the pipe to which the device is to be secured, a lug extending radially from said tubular member above said surface, and a set screw in said lug.

3. In a device of the class described, a tubular member, a cape thereon curved in conformity with the curvature of the pipe to which the device is to be secured, said cape being provided with slots located adjacent its straight edges, a lug extending radially from said tubular member above said cape, and a set screw in said lug.

4. In a device of the class described, a tubular member, having its lower end bent at right angles to the body portion thereof, a cape on said tubular member curved in conformity with the curvature of the pipe to which the device is to be secured, said cape being provided with slots located adjacent its straight edges, a lug extending radially from said tubular member above said cape, and a set screw in said lug.

In testimony whereof I have hereunto affixed my signature.

HENRY DEITZ.

Copies of this patent may be obtained for five cents each, by addressing the "Commissioner of Patents, Washington, D. C."